United States Patent
Kimura

[15] 3,639,058
[45] Feb. 1, 1972

[54] AUTOMATIC PHOTOGRAPHIC GRADATION-MEASURING SYSTEM FOR CONTROLLING AUXILIARY EXPOSURE MEANS

[72] Inventor: Tsutomu Kimura, Kanagawa, Japan
[73] Assignee: Fuji Photo Film Co., Ltd., Ashigara-Kamigun, Kanagawa, Japan
[22] Filed: Jan. 9, 1970
[21] Appl. No.: 1,669

[30] Foreign Application Priority Data
   Jan. 25, 1969 Japan.....................................44/5581

[52] U.S. Cl..............................355/83, 355/68
[51] Int. Cl........................................G03b 27/78
[58] Field of Search......................355/35, 68, 70, 71, 80, 83; 350/96 B; 250/227

[56] References Cited

UNITED STATES PATENTS

| 3,325,594 | 6/1967 | Goldhammer et al. | 350/96 X |
| 3,298,296 | 1/1967 | Mey | 355/70 X |
| 3,480,363 | 11/1969 | Stewart | 355/68 |

Primary Examiner—Samuel S. Matthews
Assistant Examiner—Fred L. Braun
Attorney—Sughrue, Rothwell, Mion, Zinn & Macpeak

[57] ABSTRACT

The focal plane on which the photographic negative image is focused is divided into a number of parts respectively connected to light-transmitting members. The ends of the light-transmitting members are arranged in a circle and scanned by another light-transmitting member which is connected to a light receptor. The output photocurrent from the light receptor is a measure of the photographic gradation of the negative image.

1 Claims, 4 Drawing Figures

AUTOMATIC PHOTOGRAPHIC GRADATION-MEASURING SYSTEM FOR CONTROLLING AUXILIARY EXPOSURE MEANS

CROSS-REFERENCE TO RELATED APPLICATION

This invention relates to my copending application Ser. No. 854,467, filed Sept. 2, 1969.

BACKGROUND OF THE INVENTION

1. Field of the Invention

This invention relates to a system for automatically measuring photographic gradation, and in particularly to a system for automatically measuring the photographic gradation of a negative image in order to control auxiliary exposure means for exposing photographic paper so that a positive image of the optimum gradation may be made from various gradation negative images.

2. Description of the Prior Art

Heretofore, in the case of making a positive image of optimum gradation from various degrees of gradation in negative images, the gradation of the negative image has been measured or examined with the eyes of the operator, and according to the experienced measurement, the operator himself selects a proper kind of paper for printing or the operator controls the auxiliary exposure for controlling the gradation on the paper to obtain a positive image of the optimum degree of gradation.

SUMMARY OF THE INVENTION

In accordance with the present invention, an automatic photographic gradation-measuring system is provided wherein the optical density at various points or parts on the negative image is converted into an output current by means of light-transmitting means and light receptors and the photographic gradation is automatically measured rather than examining the gradation by the operator's eyes.

The principal object of the present invention is to provide a system for automatically measuring the photographic gradation of negative images.

Another object of the present invention is to provide a system for automatically measuring the photographic gradation and to represent the gradation by an electrical output which can be utilized as the input to another controlling system.

Other objects and fuller understanding of this invention will be made apparent from the following description in detail taken in conjunction with the accompanying drawings in which:

DESCRIPTION OF THE PREFERRED EMBODIMENT

Figures 1, 2:
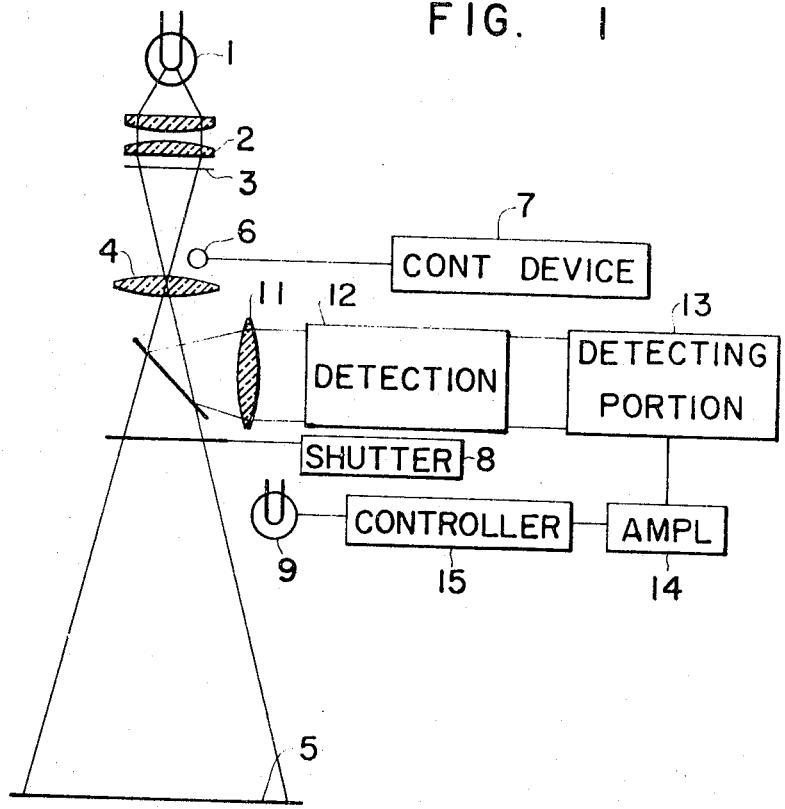
FIG. 1 is a side view of the photographic printing apparatus equipped with the automatic photographic gradation-measuring system shown in diagrammatic form.
FIG. 2 is a plan view showing the arrangement of the light-transmittors for detecting the optical density on the focal plane.

Now referring to the drawings, the automatic photographic gradation-measuring system will be described in an embodiment employed in a conventional photographic printing apparatus of the automatic exposure value control type. Referring to FIG. 1, the light from the light source 1 is condensed by the condenser lens 2 to illuminate negative 3. The image of the negative 3 is focused onto the paper 5 to be printed through focusing lens 4. The dispersed light in the light path between the negative and the focal plane is received by an exposure value-detecting receptor 6 and the received light value is converted into the photocurrent. The photocurrent is introduced into an integrating control device 7 which operates to close the shutter means 8 when the integrated photocurrent reaches the predetermined value or the correct exposure is obtained. Thus, the correct exposure is obtained by the conventional photographic printing apparatus. According to necessity, an auxiliary exposure is provided by an auxiliary lamp which has its light quantity controlled to make an optimum gradation on the paper.

In order to carry out the gradation measurement according to this invention, a half silver mirror 10 is provided in the light path and the light is divided into two focusing parts, one of which is on the paper and the other of which is on a focal plane for detection 12 by a condenser lens 11. And as described hereinafter, the negative image is transmitted to the scanning detecting portion 13 and the detected information of density is amplified by an amplifier 14 and the image gradation contrast of the negative is measured. The measured value is converted into a control signal for controlling the auxiliary exposure controller 15 to provide a proper exposure with the auxiliary lamp 9. The optical density of the negative image is transmitted through a number of light transmitters.

The main part of the automatic photographic gradation measuring system of this invention consists of a number of light transmitters arranged, on the focal plane for detection, to transmit the light from the negative image to the light receptor and a scanning portion connected to the amplifier.

The arrangement of the light transmitters is shown in FIG. 2. The end of the transmitter is positioned on the focal plane 12 for detection. The focal plane 12 is divided into a number of sections $(S_{11}, S_{12} \ldots S_{1n} \ldots S_{21} \ldots S_{ml} \ldots S_{mn})$ and the respective sections are connected to the end of the light transmitters.

Figure 3:
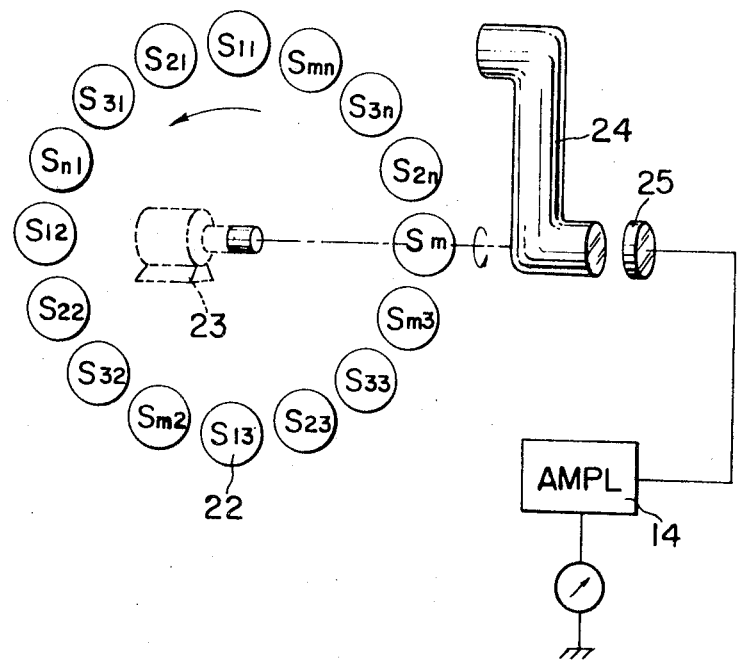
FIG. 3 is a schematic view of the scanning portion of the system for detecting the optical density of the image represented by the light quantity transmitted through the light transmittors.
Figure 4:
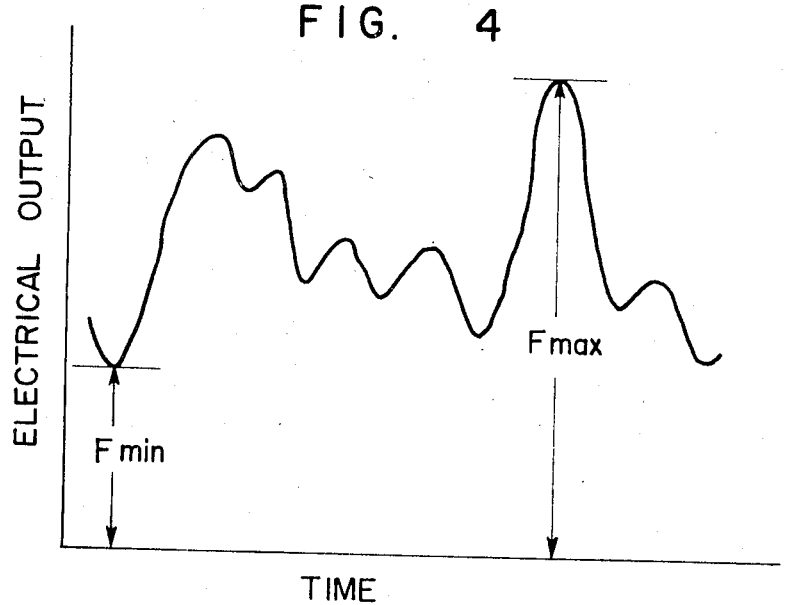
FIG. 4 is a graph showing the output wave pattern of the automatic photographic gradation-measuring system in accordance with this invention.

The scanning portion is shown in FIG. 3, wherein the ends of the light transmitters are arranged in a circle and the arranged ends are scanned by another light transmitter 24 connected to a light receptor such as a photocell 25. The light transmitter 24 is rotated by a motor 23 to scan the ends of the light transmitters in a circle. By scanning, the light transmitter 24 transmits the light to the light receptor 25 and the various parts of the focal plane 12 have their optical density detected and the gradation contrast of the negative image is measured. The light receptor 25 provides an electric current of the wave pattern as shown in FIG. 4. The difference between the Fmin and Fmax in FIG. 4 indicates the contrast of the image. The output current from the light receptor 25 may be converted into direct current through an amplifier 14 which controls the auxiliary exposure controller 15 shown in FIG. 1, and the light quantity of the auxiliary lamp 9 can be automatically controlled to provide an optimum degree of gradation.

Since the gradation contrast of the negative image is provided as an electric output in accordance with the invention, by providing the difference between the highest current and the lowest current representing the highest optical density of the negative image and the lowest optical density thereof during scanning the image, the gradation contrast of the photographic negative image can be measured much faster and more accurately than the conventional measuring method by the operator himself. Moreover, since the output is in the form of an electric current, the output can be directly utilized to control other exposure controlling means.

The invention has been described in detail with particular reference to an embodiment thereof, but it will be understood that variations and modifications can be effected within the scope of the invention as described hereinabove and as defined in the appended claims.

What is claimed is:

1. An automatic photographic gradation-measuring system comprising: a number of light-transmitting members, one end of each light-transmitting member being positioned for detection at a divided part of a focal plane upon which the negative image is focused, the other end of each light-transmitting member being planar arranged in a circular array, another light-transmitting member positioned with a light receptor at an end thereof, the other end of said another light-transmitting member being adapted to scan the ends of said light-transmitting members arranged in a circular array, an amplifier connected to said light receptor to provide an electrical output corresponding to the gradation contrast of the negative image from the photocurrent produced by said light receptor, and an auxiliary exposure lamp, and means for coupling the output from said amplifier through an auxiliary exposure controller to said lamp, whereby the light quantity of the auxiliary lamp is automatically controlled responsive to gradation contrast.

* * * * *